(12) United States Patent
Kobayashi et al.

(10) Patent No.: US 10,547,149 B2
(45) Date of Patent: *Jan. 28, 2020

(54) WIRING MODULE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Takuji Kobayashi, Mie (JP); Misako Nagai, Mie (JP)

(73) Assignees: AUTONETWORKS TECHNOLOGIES, LTD. (JP); SUMITOMO WIRING SYSTEMS, LTD. (JP); SUMITOMO ELECTRIC INDUSTRIES, LTD. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/199,976

(22) Filed: Nov. 26, 2018

(65) Prior Publication Data

US 2019/0097369 A1 Mar. 28, 2019

Related U.S. Application Data

(63) Continuation of application No. 15/872,276, filed on Jan. 16, 2018, now Pat. No. 10,181,689.

(30) Foreign Application Priority Data

Jan. 20, 2017 (JP) ................... 2017-008400

(51) Int. Cl.
*H01R 25/16* (2006.01)
*H02G 5/00* (2006.01)
(Continued)

(52) U.S. Cl.
CPC ....... *H01R 25/162* (2013.01); *B60R 16/0215* (2013.01); *H02B 1/20* (2013.01);
(Continued)

(58) Field of Classification Search
None
See application file for complete search history.

(56) References Cited

U.S. PATENT DOCUMENTS 3,104,276 A * 9/1963 Cataldo ................. H02G 5/007
174/88 B
3,180,924 A * 4/1965 Rowe ..................... H02G 5/007
174/88 B
(Continued)

*Primary Examiner* — Timothy J Thompson
*Assistant Examiner* — Muhammed Azam
(74) *Attorney, Agent, or Firm* — Reising Ethington, P.C.

(57) ABSTRACT

A wiring module includes a plurality of conductive plates, and first coupling portions and second coupling portions that are provided on outer peripheral portions of the plurality of conductive plates and have mutually connectable shapes. In this wiring module, the plurality of conductive plates are electrically connected by coupling the first coupling portions and the second coupling portions. Therefore, changing a manner in which the conductive plates are coupled (for example, changing the number of coupled conductive plates, the coupling positions thereof, or the coupling angles thereof) makes it possible to use the wiring module in various layouts depending on the shapes of vehicles.

5 Claims, 12 Drawing Sheets

(51) Int. Cl.
*B60R 16/02* (2006.01)
*H02B 1/20* (2006.01)
*H01R 35/04* (2006.01)

(52) U.S. Cl.
CPC ........ *H02G 5/007* (2013.01); *B60Y 2410/115* (2013.01); *H01R 35/04* (2013.01); *H01R 2201/26* (2013.01)

(56) References Cited

U.S. PATENT DOCUMENTS

| | | | | |
|---|---|---|---|---|
| 3,346,776 A * | 10/1967 | Olashaw | H02B 1/36 | 174/99 B |
| 3,375,411 A * | 3/1968 | Mrowka | H02B 1/056 | 200/294 |
| 3,710,301 A * | 1/1973 | Weimer | H02G 5/007 | 439/213 |
| 3,852,515 A * | 12/1974 | Jorgensen | H02G 5/06 | 174/68.2 |
| 5,351,165 A * | 9/1994 | Hancock | H02B 1/056 | 174/68.2 |
| 5,619,014 A * | 4/1997 | Faulkner | H02G 5/007 | 174/129 B |
| 5,684,273 A * | 11/1997 | Erdle | H02G 5/005 | 174/71 B |
| 5,936,834 A * | 8/1999 | Polston | H02B 1/20 | 361/660 |
| 5,971,799 A * | 10/1999 | Swade | B60R 16/0207 | 439/502 |
| 6,024,589 A * | 2/2000 | Hahn, IV | H05K 1/148 | 174/71 B |
| 6,093,037 A * | 7/2000 | Lin | H01R 25/162 | 439/115 |
| 6,417,452 B1 * | 7/2002 | Doshita | B60R 16/0215 | 174/135 |
| 6,454,591 B1 * | 9/2002 | Pradier | H01R 4/38 | 439/364 |
| 6,455,179 B1 * | 9/2002 | Sugita | H01M 8/249 | 180/65.31 |
| 6,521,837 B2 * | 2/2003 | Hilgert | H01R 25/162 | 174/149 B |
| 6,603,075 B1 * | 8/2003 | Soares | H02B 1/21 | 174/149 B |
| 6,898,085 B2 * | 5/2005 | Haba | G06F 13/409 | 174/70 B |
| 7,141,737 B2 * | 11/2006 | Nakamura | B60R 16/0215 | 174/72 A |
| 7,867,021 B1 * | 1/2011 | Brant | H01R 4/40 | 439/504 |
| 8,054,633 B2 * | 11/2011 | Suwa | B60L 1/003 | 361/728 |
| 8,105,103 B2 * | 1/2012 | Nishio | H01R 4/305 | 439/287 |
| 8,148,640 B2 * | 4/2012 | Cagliani | H02G 5/025 | 174/137 R |
| 8,550,830 B1 * | 10/2013 | Bhathija | H01R 31/02 | 439/213 |
| 8,717,741 B2 * | 5/2014 | Valenzuela | H01R 25/162 | 174/149 B |
| 9,241,431 B2 * | 1/2016 | Hashimoto | B60R 16/0215 | |
| 9,257,759 B2 * | 2/2016 | Nobukuni | H01R 4/305 | |
| 9,705,300 B1 * | 7/2017 | Maurer | H02G 5/007 | |
| 9,865,909 B2 * | 1/2018 | Chan | H01P 1/2053 | |
| 9,882,366 B2 * | 1/2018 | Maurer | H02G 5/007 | |
| 9,944,172 B2 * | 4/2018 | Basavarajappa | B60K 15/05 | |
| 2004/0040733 A1 * | 3/2004 | Yuasa | H01R 13/17 | 174/68.2 |
| 2005/0014541 A1 * | 1/2005 | Clerc | A44B 11/2588 | 455/575.7 |
| 2012/0138331 A1 * | 6/2012 | Richard | H02G 5/007 | 174/68.2 |
| 2012/0148890 A1 * | 6/2012 | Goto | H01M 2/1077 | 429/90 |
| 2012/0263988 A1 * | 10/2012 | Obasih | H01M 10/625 | 429/98 |
| 2013/0164959 A1 * | 6/2013 | Furuya | H01R 13/6397 | 439/153 |
| 2013/0171849 A1 * | 7/2013 | Mooney | H02G 5/007 | 439/213 |
| 2013/0171850 A1 * | 7/2013 | Mooney | H02G 5/007 | 439/213 |
| 2013/0180751 A1 * | 7/2013 | Shimizu | H01R 25/161 | 174/68.2 |
| 2014/0017953 A1 * | 1/2014 | Iwano | H01R 12/777 | 439/660 |
| 2015/0037626 A1 * | 2/2015 | Malcolm | H01M 2/206 | 429/53 |
| 2016/0149329 A1 * | 5/2016 | Nakata | H01B 7/08 | 439/660 |
| 2016/0190542 A1 * | 6/2016 | Sengoku | H01M 2/1077 | 429/90 |
| 2018/0212381 A1 * | 7/2018 | Kobayashi | H01R 25/162 | |

* cited by examiner

WIRING MODULE

CROSS REFERENCE TO RELATED APPLICATIONS

This application is a continuation of U.S. application Ser. No. 15/872,276, filed Jan. 16, 2018, and claims the benefit of Japanese Application No. JP2017-008400, filed on Jan. 20, 2017, the contents of both of which are hereby incorporated by reference in their entirety.

TECHNICAL FIELD

The present invention relates to a wiring module including a plurality of conductive plates.

BACKGROUND ART

JP 2016-101046A discloses a wiring module formed by stacking a plurality of flat wiring bodies. This wiring module is a large module molded in one piece into a shape for mounting to a vehicle.

JP 2016-101046A is an example of related art.

SUMMARY

However, a wiring module molded in one piece in this manner cannot be mounted in a vehicle having a shape that is different from a shape for which the wiring module has been designed.

To address this, it is an object of the present design to provide a wiring module capable of being used in various layouts depending on the shapes of vehicles.

To solve the foregoing problems, a wiring module according to a first aspect includes a plurality of conductive plates, and first coupling portions and second coupling portions that are provided on outer peripheral portions of the plurality of conductive plates and have mutually connectable shapes, wherein the plurality of conductive plates are electrically connected by coupling the first coupling portions and the second coupling portions.

A second aspect is the wiring module according to the first aspect, wherein the plurality of conducive plates have the same shape, the first coupling portions provided on the outer peripheral portions of the plurality of conducive plates have the same shape, and the second coupling portions provided on the outer peripheral portions of the plurality of conducive plates have the same shape.

A third aspect is the wiring module according to the first or second aspect, wherein the first coupling portions and the second coupling portions each include a screwed portion, and a common screw is inserted into the first coupling portion provided on the outer peripheral portion of one of the adjacent two conductive plates and the second coupling portion provided on the outer peripheral portion of the other to couple the first coupling portion and the second coupling portion.

A fourth aspect is the wiring module according to the third aspect, wherein, in each of the plurality of conductive plates, the first coupling portion is provided at one end in a longitudinal direction, and the second coupling portion is provided at the other end in the longitudinal direction.

A fifth aspect is the wiring module according to the fourth aspect, wherein, in each of the plurality of conductive plates, the first coupling portion is provided at a corner portion at the one end, and the second coupling portion is provided at a corner portion at the other end.

A sixth aspect is the wiring module according to the fourth or fifth aspect, wherein, in each of the plurality of conductive plates, at least one of the first coupling portion and the second coupling portion is provided at an intermediate portion in a longitudinal direction.

A seventh aspect is the wiring module according to the first or second aspect, wherein the first coupling portions are parts of the outer peripheral portions of the plurality of conductive plates that have been processed into a protruding shape, the second coupling portions are parts of the outer peripheral portions of the plurality of conductive plates that have been processed into a recessed shape, and the first coupling portion provided on the outer peripheral portion of one of the adjacent two conductive plates is fitted to the second coupling portion provided on the outer peripheral portion of the other to couple the first coupling portion and the second coupling portion.

An eighth aspect is the wiring module according to the seventh aspect, wherein, in each of the plurality of conductive plates, the first coupling portion is provided at one end in a longitudinal direction, and the second coupling portion is provided at the other end in the longitudinal direction.

A ninth aspect is the wiring module according to the eighth aspect, wherein, in each of the plurality of conductive plates, at least one of the first coupling portion and the second coupling portion is provided at an intermediate portion in a longitudinal direction.

A tenth aspect is the wiring module according to any one of the first to ninth aspects, and further includes a branch conductive plate, and branch coupling portions that are provided at at least three positions on an outer peripheral portion of the branch conductive plate and can be coupled to one of the first coupling portion or the second coupling portion.

An eleventh aspect is the wiring module according to any one of the first to tenth aspects, and further includes a fuse, an insulating base that holds the fuse, a coupling portion for a fuse that is provided on an outer peripheral portion of the base and can be coupled to at least one of the first coupling portion and the second coupling portion, and a conductive member that has a conductive path including the fuse and is electrically connected to the conductive plate coupled via the coupling portion for a fuse.

With the first to eleventh aspects, in the wiring module, the plurality of conductive plates are electrically connected by coupling the first coupling portions and the second coupling portions. Therefore, changing a manner in which the conductive plates are coupled makes it possible to use the wiring module in various layouts depending on the shapes of vehicles.

With the second aspect, the elements of each type included in the wiring module have the same shape, thus making it possible to improve the productivity.

With the third aspect, the adjacent conductive plates can be coupled via a simple structure using a screw.

With the fourth aspect, in each of the conductive plates, the first coupling portion is provided at one end in the longitudinal direction and the second coupling portion is provided at the other end in the longitudinal direction. Therefore, even when a small number of conductive plates are used, it is easy to lay out the wiring module over a long distance.

With the fifth aspect, the first coupling portions and the second coupling portions are coupled at the corner portions of the conductive plates, thus making it possible to adjust the coupling angles between the conductive plates in a broad range.

With the sixth aspect, in each of the conductive plates, at least one of the first coupling portion and the second coupling portion is provided at an intermediate portion in the longitudinal direction. Flexibility of the layout of the wiring module is improved by providing the coupling portions at both ends and the intermediate portion in the longitudinal direction in this manner.

With the seventh aspect, the first coupling portion and the second coupling portion are coupled via a fitting structure, and therefore, it is easy to couple the conductive plates.

With the eighth aspect, in each of the conductive plates, the first coupling portion is provided at one end in the longitudinal direction and the second coupling portion is provided at the other end in the longitudinal direction. Therefore, even when a small number of conductive plates are used, it is easy to lay out the wiring module over a long distance.

With the ninth aspect, in each of the conductive plates, at least one of the first coupling portion and the second coupling portion is provided at an intermediate portion in the longitudinal direction. Flexibility of the layout of the wiring module is improved by providing the coupling portions at both ends and the intermediate portion in the longitudinal direction in this manner.

With the tenth aspect, the branch coupling portions capable of being coupled with one of the first coupling portion or the second coupling portion are provided at at least three positions on the outer peripheral portion of the branch conductive plate. Using this branch conductive plate makes it easy to form branches in the wiring module.

With the eleventh aspect, a fuse can be easily incorporated in the wiring module.

EMBODIMENTS

First Embodiment

Figure 1:
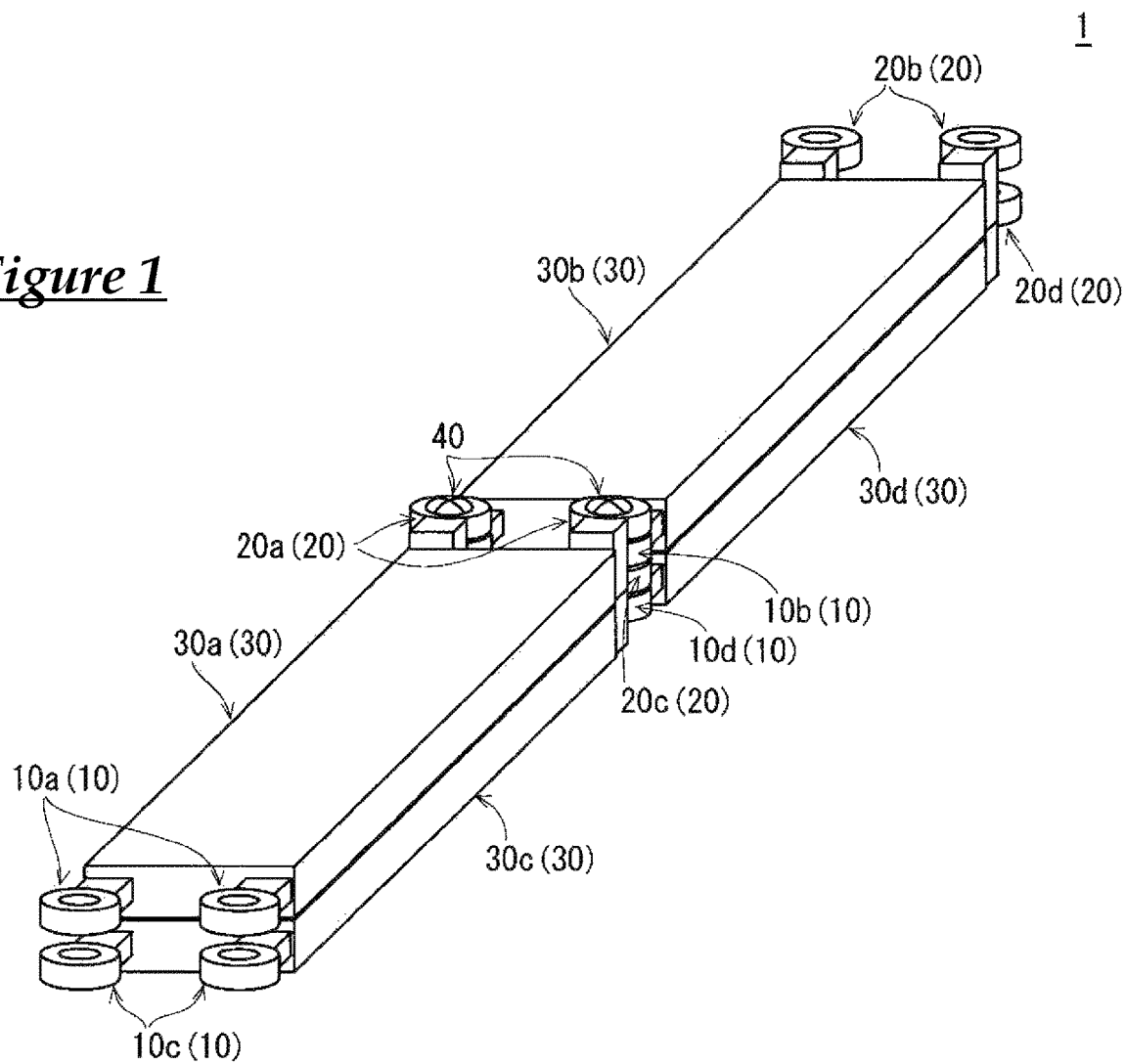
FIG. 1 is a schematic perspective view showing a wiring module 1.
Figure 2:
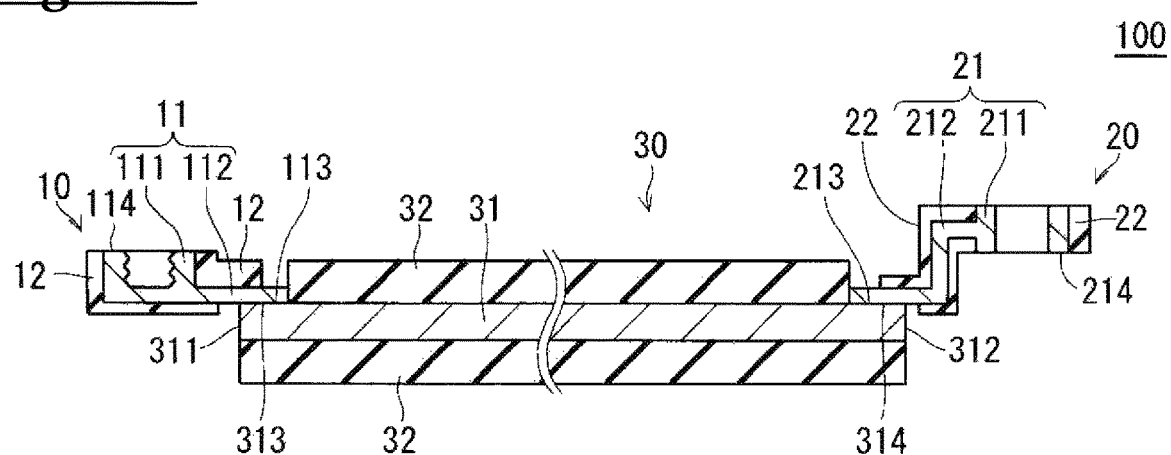
FIG. 2 is a longitudinal cross-sectional view showing one conductive plate 30, and a first coupling portion 10 and a second coupling portion 20 that are provided on the outer peripheral portion of the conductive plate 30.
Figure 3:
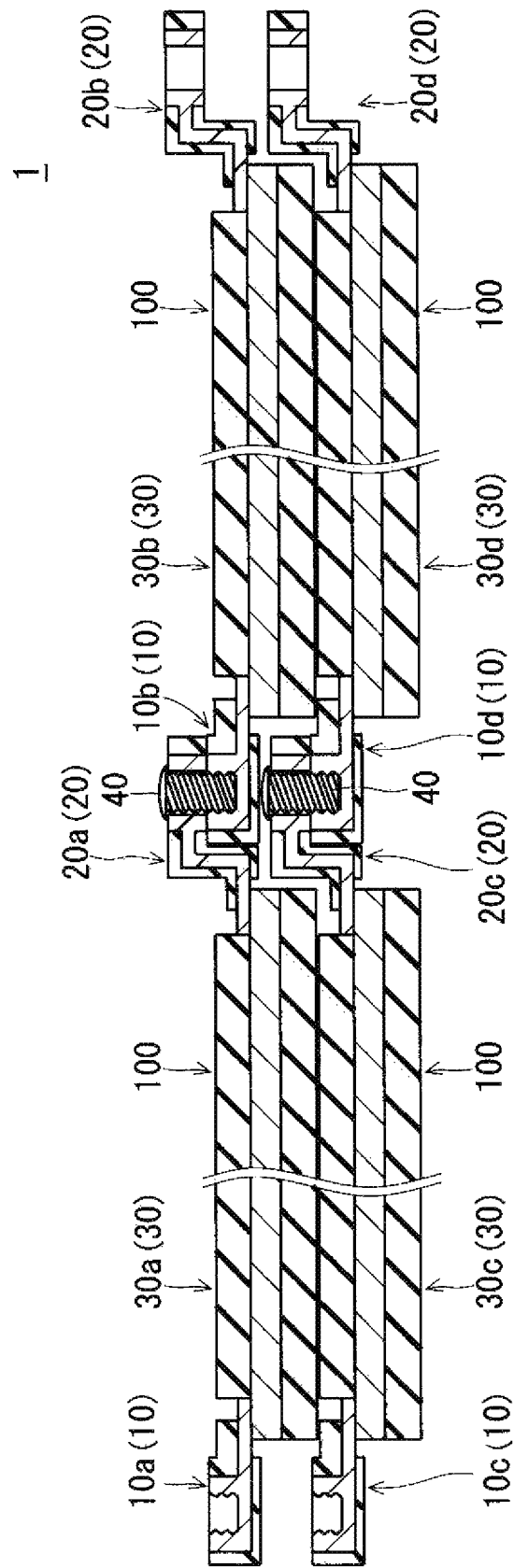
FIG. 3 is a longitudinal cross-sectional view of the wiring module 1 shown in FIG. 1.

Hereinafter, a wiring module according to a first embodiment will be described. FIG. 1 is a schematic perspective view showing a wiring module 1. FIG. 2 is a longitudinal cross-sectional view showing one conductive plate 30, and a first coupling portion 10 and a second coupling portion 20 that are provided on the outer peripheral portion of the conductive plate 30. FIG. 3 is a longitudinal cross-sectional view of the wiring module 1 shown in FIG. 1.

The wiring module 1 includes a plurality of conductive plates 30, and first coupling portions 10 and second coupling portions 20 that are provided on the outer peripheral portions of the conductive plates 30 and have mutually connectable shapes.

Hereinafter, with reference to FIGS. 1 to 3, a case will be described in which the wiring module 1 includes four conductive plates 30, and first coupling portions 10 and second coupling portions 20 that are provided on the outer peripheral portions of the four conductive plates and have mutually connectable shapes.

It should be noted that, in the example shown in FIGS. 1 to 3, the wiring module 1 is formed by stacking, one on top of the other, two conductive plates 30a and 30b coupled in the horizontal direction and two conductive plates 30c and 30d coupled in the horizontal direction. Hereinafter, when the individual conductive plates 30a to 30d are distinguished from one another, they are denoted by additional alphabetical characters, and when they are not distinguished, they are referred to merely as "conductive plates 30". The same applies to the first coupling portions 10 and the second coupling portions 20. Moreover, a configuration including one conductive plate 30, and first coupling portions 10 and second coupling portions 20 provided on the conductive plate 30 is referred to as "unit module 100". It should be noted that, in this embodiment, the conductive plates 30a to 30d have the same shape, the first coupling portions 10a to 10d have the same shape, and the second coupling portions 20a to 20d have the same shape.

Each of the conductive plates 30 includes a flattened conductor 31 and a coating portion 32.

The flattened conductor 31 is formed in an elongated shape such that a cross section taken along a plane orthogonal to the longitudinal direction has a flattened shape (here, a rectangular shape elongated in one direction). The flattened conductor 31 is made of a metal plate having an elongated band shape. The flattened conductor 31 is made of a material such as copper, a copper alloy, aluminum, or an aluminum alloy. The flattened conductor 31 may be plated with metal such as tin or nickel.

The coating portion 32 is an insulating member for covering the flattened conductor 31 in a flattened shape. The coating portion 32 is formed by performing extrusion coating to cover the periphery of the flattened conductor 31 with a resin and then stripping off a portion of the coating, for example. The periphery of the flattened conductor 31 is coated with the coating portion 32 having a uniform thickness, and therefore, a cross section of the conductive plate 30 that is orthogonal to the longitudinal direction has a flattened shape. It should be noted that, as shown in FIG. 2, side surfaces 311 and 312, and top surfaces 313 and 314, on both sides of the flattened conductor 31 in the longitudinal direction are exposed to the outside due to the coating, which is a portion of the coating portion 32, being stripped off.

In each of the conductive plates 30, two first coupling portions 10 spaced apart from each other in the short direction are provided at one end in the longitudinal direction, and two second coupling portions 20 spaced apart from each other in the short direction are provided at the other end in the longitudinal direction. More specifically, in each of the conductive plates 30, two first coupling portions 10 are provided at both corner portions at one end in the longitudinal direction, and two second coupling portions 20 are provided at both corner portions at the other end in the longitudinal direction.

The first coupling portions 10 each include a screwed portion 11 and a coating portion 12.

The screwed portion 11 includes a threaded hole portion 111 having a recessed shape, and an extending portion 112 that extends from the bottom of the threaded hole portion 111 in the horizontal direction. The threaded hole portion 111 is a female screw in which a screw thread that is screwed on a screw 40 (male screw) when the screw 40 is inserted thereinto is formed on the inner circumferential surface. The screwed portion 11 is made of a conductive member. For example, the screwed portion 11 is made of a material such as copper, a copper alloy, aluminum, or an aluminum alloy. The screw 40 may be made of metal or a resin or the like.

The coating portion 12 is an insulating member that covers the outer circumferential surface of the screwed portion 11. The coating portion 12 is formed by molding a resin around the screwed portion 11, for example. It should be noted that a lower surface 113 on the conductive plate 30 side (right side in FIG. 2) of the extending portion 112 of the screwed portion 11 is not coated with the coating portion 12 and is exposed to the outside.

The screwed portion 11 is provided at one end (on the left side in FIG. 2) of the conductive plate 30 in the longitudinal direction. More specifically, the lower surface 113 of the extending portion 112 of the screwed portion 11 and a top surface 313 of the flattened conductor 31 are joined by welding or the like. As a result, the first coupling portion 10 and the conductive plate 30 are electrically connected.

The second coupling portion 20 includes a screwed portion 21 and a coating portion 22.

The screwed portion 21 includes a threaded hole portion 211 having a tubular shape, and an extending portion 212 that extends from the threaded hole portion 211 in the horizontal direction and the downward direction. The threaded hole portion 211 is a tubular portion whose inner diameter is substantially the same as that of the threaded hole portion 111 and through which the screw 40 (male screw) can be inserted. The screwed portion 21 is made of a conductive member. For example, the screwed portion 21 is made of a material such as copper, a copper alloy, aluminum, or an aluminum alloy.

The coating portion 22 is an insulating member that covers the outer circumferential surface of the screwed portion 21. The coating portion 22 is formed by molding a resin around the screwed portion 21, for example. It should be noted that a lower surface 213 on the conductive plate 30 side (left side in FIG. 2) of the extending portion 212 of the screwed portion 21 is not coated with the coating portion 22 and is exposed to the outside.

The screwed portion 21 is provided at one end (on the right side in FIG. 2) of the conductive plate 30 in the longitudinal direction. More specifically, the lower surface 213 of the extending portion 212 of the screwed portion 21 and a top surface 314 of the flattened conductor 31 are joined by welding or the like. As a result, the second coupling portion 20 and the conductive plate 30 are electrically connected.

As a result, the unit module 100 in which the first coupling portions 10 and the second coupling portions 20 are joined to the conductive plate 30 as shown in FIG. 2 is obtained. In the unit module 100, the top surface 114 of the threaded hole portion 111 of the first coupling portion 10 and the lower surface 214 of the threaded hole portion 211 of the second coupling portion 20 are located at substantially the same height.

Regarding the two adjacent conductive plates 30*a* and 30*b*, common screws 40 are inserted into two second coupling portions 20*a* provided on the outer peripheral portion of the conductive plate 30*a* and two first coupling portions 10*b* provided on the outer peripheral portion of the conductive plate 30*b*, and, in this state, the two screws 40 are screwed and fastened to two threaded hole portions 111, so that the two first coupling portions 10*b* and the two second coupling portions 20*a* are coupled. As a result, a relative positional relationship between the conductive plate 30*a* and the conductive plate 30*b* is fixed. In this coupled state, top surfaces 114*b* of the threaded hole portions 111*b* of the two first coupling portions 10*b* are in contact with lower surfaces 214*a* of threaded hole portions 211*a* of the two second coupling portions 20*a*. As a result, the conductive plate 30*a* and the conductive plate 30*b* are electrically connected via the two first coupling portions 10*b* and the two second coupling portions 20*a*.

Similarly, regarding the two adjacent conductive plates 30*c* and 30*d*, common screws 40 are inserted into two second coupling portions 20*c* provided on the outer peripheral portion of the conductive plate 30*c* and two first coupling portions 10*d* provided on the outer peripheral portion of the conductive plate 30*d*, and, in this state, the two screws 40 are screwed and fastened to two threaded hole portions 111*d*, so that the two first coupling portions 10*d* and the two second coupling portions 20*c* are coupled. As a result, a relative positional relationship between the conductive plate 30*c* and the conductive plate 30*d* is fixed. In this coupled state, top surfaces 114*d* of the threaded hole portions 111*d* of the two first coupling portions 10*d* are in contact with lower surfaces 214*c* of threaded hole portions 211*c* of the two second coupling portions 20*c*. As a result, the conductive plate 30*c* and the conductive plate 30*d* are electrically connected via the two first coupling portions 10*d* and the two second coupling portions 20*c*.

The wiring module 1 is formed by stacking, one on top of the other, the two conductive plates 30*a* and 30*b* coupled in the horizontal direction and the two conductive plates 30*c* and 30*d* coupled in the horizontal direction. In this case, for example, the two conductive plates 30*a* and 30*b* are used as a voltage supplying conductive layer, and the two conductive plates 30*c* and 30*d* are used as a grounding conductive layer. Adhesive sheets or the like (not shown) are respectively provided between the conductive plates 30*a* and 30*c*, which are stacked one on top of the other, and between the conductive plates 30*b* and 30*d*, which are stacked one on top of the other, thus preventing the conductive plates 30*a* and 30*c* and the conductive plates 30*b* and 30*d* from being misaligned in the horizontal direction.

The wiring module 1 of this embodiment is used as a wiring member for electrically connecting a battery and a DC-DC converter, starter generator or inverter in a vehicle, for example. In this case, for example, after the four unit modules 100 are individually transported to an assembly factory, the wiring module 1 can be completed by coupling the unit modules 100 in the assembly factory and then mounted in a vehicle. The unit modules 100 can be individually transported in this manner, and therefore, the transportation is facilitated compared with a case where a wiring module (e.g., wiring module described in JP 2016-101046A) molded in one piece into a shape for mounting to a vehicle is transported.

In the wiring module 1 of this embodiment, the two conductive plates 30a and 30b are electrically connected by coupling the second coupling portions 20a and the first coupling portions 10b. Similarly, the two conductive plates 30c and 30d are electrically connected by coupling the second coupling portions 20c and the first coupling portions 10d. Therefore, changing a manner in which the conductive plates 30 are coupled (for example, changing the number of coupled conductive plates, the coupling positions thereof, or the coupling angles thereof) makes it possible to use the wiring module 1 in various layouts. Specifically, the unit modules 100 according to this embodiment may be used in common as components for different types of vehicles. Examples in which the layout of the wiring module 1 is changed will be described later with reference to FIGS. 4 to 6.

In this embodiment, the conductive plates 30 have the same shape, the first coupling portions 10 have the same shape, and the second coupling portions 20 have the same shape. The elements of each type included in the wiring module have the same shape in this manner, thus making it possible to improve the productivity.

In the wiring module 1 of this embodiment, the adjacent conductive plates 30 can be coupled via a simple structure using a screw.

In the wiring module 1 of this embodiment, in each of the conductive plates 30, the first coupling portions 10 are provided at one end in the longitudinal direction and the second coupling portions 20 are provided at the other end in the longitudinal direction. Therefore, even when a small number of conductive plates 30 are used, it is easy to lay out the wiring module 1 over a long distance.

Modified Examples of First Embodiment

Although a multilayered wiring module 1 in which two conductive plates 30 are stacked is described in the first embodiment, the wiring module may be constituted by a single layer or a plurality of layers including three or more layers.

Figure 4:
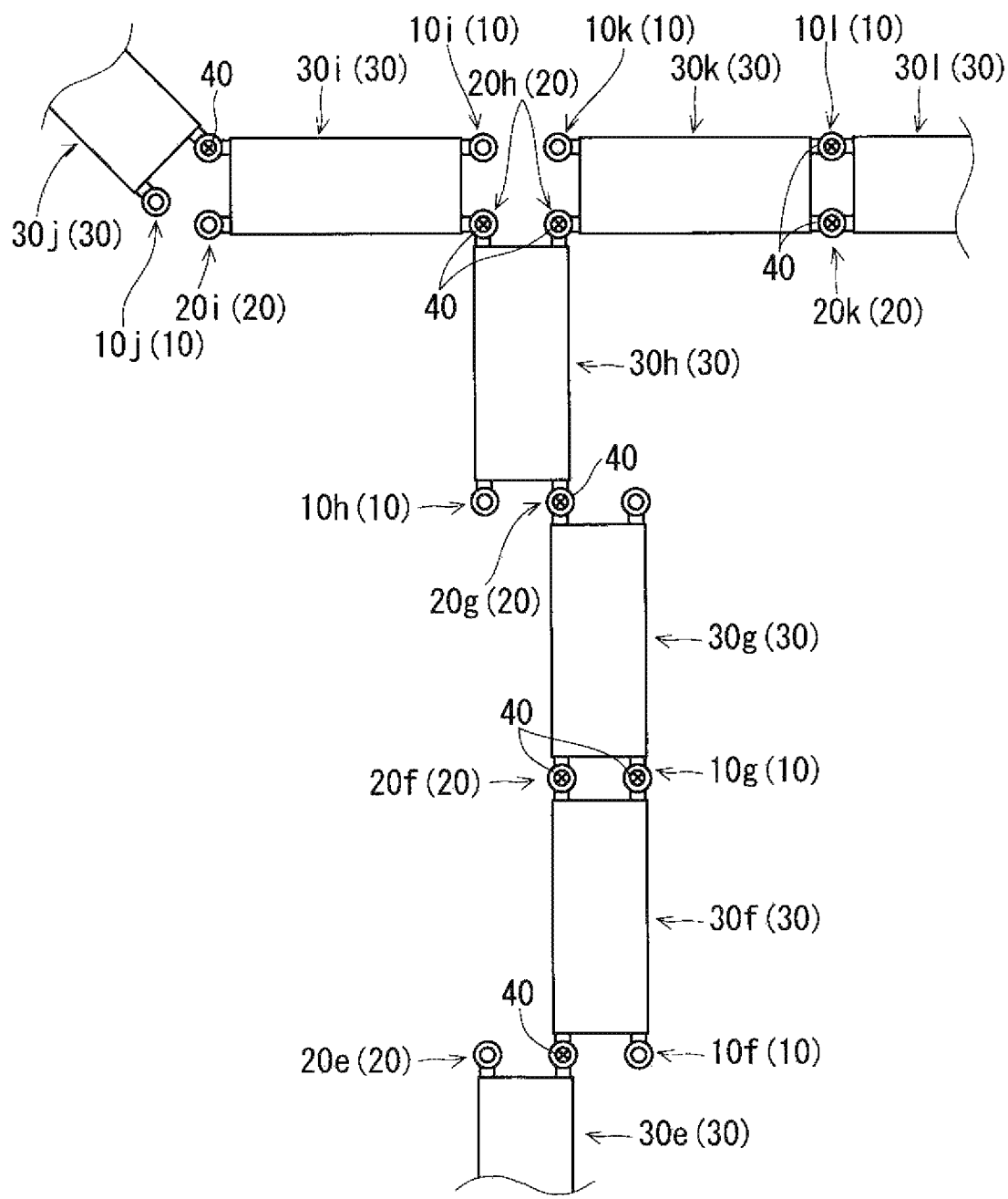
FIG. 4 is a plan view showing a layout of a wiring module 1A.

FIG. 4 is a plan view showing a layout of a wiring module 1A according to a modified example of the first embodiment.

As shown in FIG. 4, the wiring module 1A includes eight conductive plates 30e to 30l, and first coupling portions 10e to 10l and second coupling portions 20e to 20l that are provided on the outer peripheral portions of the eight conductive plates 30e to 30l and have mutually connectable shapes. The conductive plates 30 are electrically connected by coupling the first coupling portions 10 and the second coupling portions 20.

More specifically, as described below, the conductive plates 30 are connected using a plurality of screws 40. One of the two second coupling portions 20e provided on the outer peripheral portion of the conductive plate 30e and one of the two first coupling portions 10f provided on the outer peripheral portion of the conductive plate 30f are coupled using one screw 40. The two second coupling portions 20f provided on the outer peripheral portion of the conductive plate 30f and the two first coupling portions 10g provided on the outer peripheral portion of the conductive plate 30g are coupled using two screws 40. One of the two second coupling portions 20g provided on the outer peripheral portion of the conductive plate 30g and one of the two first coupling portions 10h provided on the outer peripheral portion of the conductive plate 30h are coupled using one screw 40. One of the two second coupling portions 20h provided on the outer peripheral portion of the conductive plate 30h and one of the two first coupling portions 10i provided on the outer peripheral portion of the conductive plate 30i are coupled using one screw 40. One of the two second coupling portions 20i provided on the outer peripheral portion of the conductive plate 30i and one of the two first coupling portions 10j provided on the outer peripheral portion of the conductive plate 30j are coupled using one screw 40. One of the two second coupling portions 20h provided on the outer peripheral portion of the conductive plate 30h and one of the two first coupling portions 10k provided on the outer peripheral portion of the conductive plate 30k are coupled using one screw 40. The two second coupling portions 20k provided on the outer peripheral portion of the conductive plate 30k and the two first coupling portions 10l provided on the outer peripheral portion of the conductive plate 30l are coupled using two screws 40. As a result, wiring branches are formed between the three conductive plates 30h, 30i and 30k.

In this modified example, there are some positions at which one first coupling portion 10 and one second coupling portion 20 are coupled using one screw 40 between the adjacent conductive plates 30. In this case, a relative positional relationship between the adjacent conductive plates 30 can be adjusted by rotating the adjacent conductive plates 30 around the one screw 40 in a state in which the screw 40 is fastened loosely. Thereafter, the screw 40 can be fastened firmly to fix the relative relationship between the adjacent conductive plates 30.

In this modified example, in each of the conductive plates 30, two first coupling portions 10 are provided at the corner portions at one end in the longitudinal direction and two second coupling portions 20 are provided at the corner portions at the other end in the longitudinal direction. The first coupling portions 10 and the second coupling portions 20 are coupled at the corner portions of the conductive plates 30. Therefore, the coupling angles between the conductive plates 30 can be adjusted in a broad range. The layout of the wiring module 1A is changed as appropriate depending on the position at which the wiring module 1A is to be mounted. For example, this wiring module 1A is mounted in a vehicle, the coupling angles between the conductive plates 30 are adjusted such that the wiring module 1A may avoid other members (e.g., console box located at substantially the center of the vehicle) in the vehicle.

Figure 5:
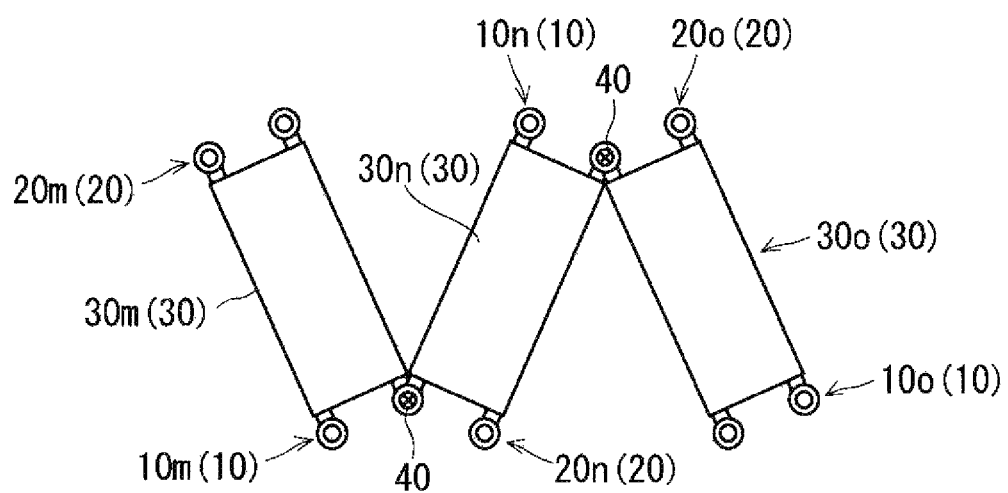
FIG. 5 is a plan view showing a layout of a wiring module 1B.

FIG. 5 is a plan view showing a layout of a wiring module 1B according to a modified example of the first embodiment.

As shown in FIG. 5, the wiring module 1B includes three conductive plates 30m to 30o, and first coupling portions 10m to 10o and second coupling portions 20m to 20o that are provided on the outer peripheral portions of the three conductive plates 30m to 30o and have mutually connectable shapes. The conductive plates 30 are electrically connected by coupling the first coupling portions 10 and the second coupling portions 20.

More specifically, as described below, the conductive plates 30 are connected using a plurality of screws 40. One of the two first coupling portions 10m provided on the outer peripheral portion of the conductive plate 30m and one of the two second coupling portions 20n provided on the outer peripheral portion of the conductive plate 30n are coupled using one screw 40. One of the two first coupling portions 10n provided on the outer peripheral portion of the conductive plate 30n and one of the two second coupling portions 20o provided on the outer peripheral portion of the conductive plate 30o are coupled using one screw 40.

In the wiring module 1B according to this modified example, the coupling angles between conductive plates 30 are adjusted such that the angle between the adjacent conductive plates 30*m* and 30*n* and the angle between the adjacent conductive plates 30*n* and 30*o* are minimized. The wiring module 1B is laid out in a space-saving manner in a plan view, and thus is favorable when transported to an assembly factory.

Figure 6:
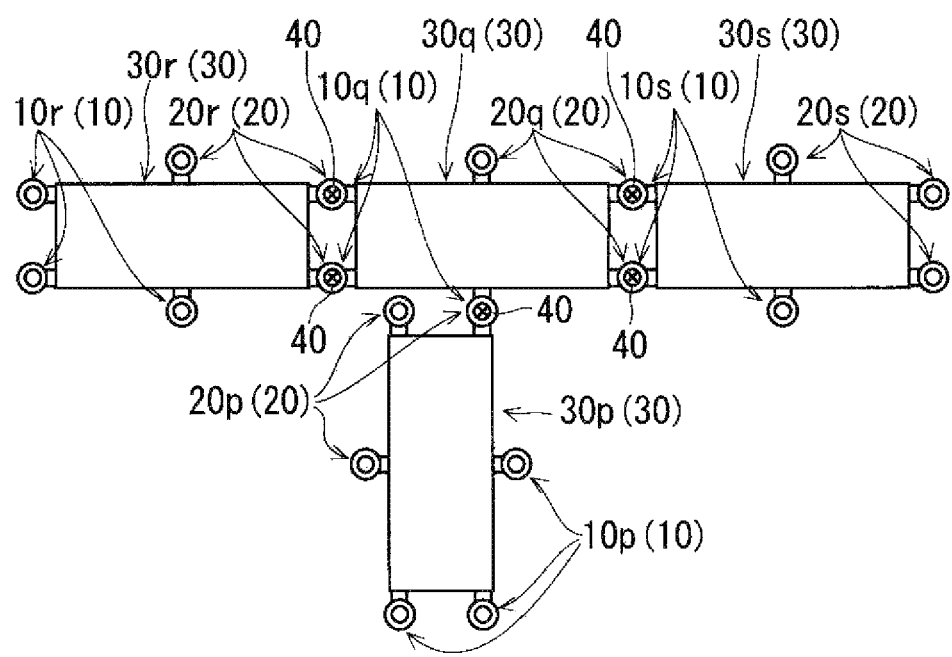
FIG. 6 is a plan view showing a layout of a wiring module 1C.

FIG. 6 is a plan view showing a layout of a wiring module 1C according to a modified example of the first embodiment.

As shown in FIG. 6, the wiring module 1C includes four conductive plates 30*p* to 30*s*, and first coupling portions 10*p* to 10*s* and second coupling portions 20*p* to 20*s* that are provided on the outer peripheral portions of the four conductive plates 30*p* to 30*s* and have mutually connectable shapes. The conductive plates 30 are electrically connected by coupling the first coupling portions 10 and the second coupling portions 20.

In the wiring module 1C, in each of the conductive plates 30, three first coupling portions 10 in total are provided at both corner portions at one end in the longitudinal direction and an intermediate portion in the longitudinal direction, and three second coupling portions 20 in total are provided at both corner portions at the other end in the longitudinal direction and an intermediate portion in the longitudinal direction.

As described below, the conductive plates 30 are connected using a plurality of screws 40. One second coupling portion 20*p* provided at the corner portion out of the three second coupling portions 20*p* provided on the outer circumferential portion of the conductive plate 30*p* and one first coupling portion 10*q* provided at the intermediate portion in the longitudinal direction out of the three first coupling portions 10*q* provided on the outer circumferential portion of the conductive plate 30*q* are coupled using a screw 40. Two second coupling portions 20*q* provided at the two corner portions out of the three second coupling portions 20*q* provided on the outer circumferential portion of the conductive plate 30*q* and two first coupling portion 10*s* provided at the two corner portions out of the three first coupling portions 10*s* provided on the outer circumferential portion of the conductive plate 30*s* are coupled using two screws 40. Two second coupling portions 20*r* provided at the two corner portions out of the three second coupling portions 20*r* provided on the outer circumferential portion of the conductive plate 30*r* and two first coupling portion 10*q* provided at the two corner portions out of the three first coupling portions 10*q* provided on the outer circumferential portion of the conductive plate 30*q* are coupled using two screws 40.

In the wiring module 1C according to this modified example, in each of the conductive plates 30, the first coupling portions 10 and the second coupling portions 20 are provided at both ends and intermediate portions in the longitudinal direction. Therefore, wiring branches can be easily formed, and flexibility of the layout of the wiring module is improved. It should be noted that it is not essential to provide both the first coupling portion 10 and the second coupling portion 20 at the intermediate portions in the longitudinal direction, and at least one of the first coupling portion 10 and the second coupling portion 20 may be provided at intermediate portions in the longitudinal direction.

Figure 7:
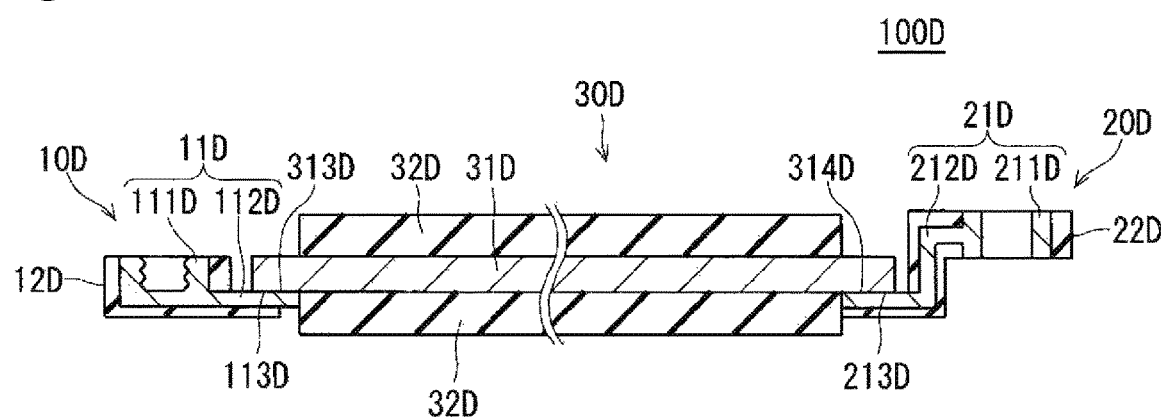
FIG. 7 is a longitudinal cross-sectional view showing a unit module 100D.

FIG. 7 is a longitudinal cross-sectional view showing a unit module 100D according to a modified example of the first embodiment.

As shown in FIG. 7, the unit module 100D includes one conductive plate 30D, and a first coupling portion 10D and a second coupling portion 20D that are provided on the conductive plate 30D.

The conductive plate 30D includes a flattened conductor 31D and a coating portion 32D. The flattened conductor 31D is made of a metal plate having an elongated band shape as is the case with the flattened conductor 31 according to the above-mentioned first embodiment. The coating portion 32D is an insulating member for covering the flattened conductor 31D in a flattened shape. It should be noted that, as shown in FIG. 7, both ends of the flattened conductor 31D in the longitudinal direction are not covered with the coating portion 32D and are exposed to the outside.

The first coupling portions 10D includes a screwed portion 11D and a coating portion 12D. The screwed portion 11D includes a threaded hole portion 111D having a recessed shape, and an extending portion 112D that extends from the bottom of the threaded hole portion 111D in the horizontal direction. The coating portion 12D is an insulating member that covers the outer circumferential surface of the screwed portion 11D. The coating portion 12D is formed by molding a resin around the screwed portion 11D, for example. It should be noted that a top surface 113D on the conductive plate 30D side (right side in FIG. 7) of the extending portion 112D of the screwed portion 11D is not coated with the coating portion 12D and is exposed to the outside. The screwed portion 11D is provided at one end (on the left side in FIG. 7) of the conductive plate 30D in the longitudinal direction. More specifically, the top surface 113D of the extending portion 112D of the screwed portion 11D and a lower surface 313D of the flattened conductor 31D are joined by welding or the like. As a result, the first coupling portion 10D and the conductive plate 30D are electrically connected.

The second coupling portion 20D includes a screwed portion 21D and a coating portion 22D. The screwed portion 21D includes a threaded hole portion 211D having a tubular shape, and an extending portion 212D that extends from the threaded hole portion 211D in the horizontal direction and the downward direction. The coating portion 22D is an insulating member that covers the outer circumferential surface of the screwed portion 21D. The coating portion 22D is formed by molding a resin around the screwed portion 21D, for example. It should be noted that a top surface 213D on the conductive plate 30D side (left side in FIG. 7) of the extending portion 212D of the screwed portion 21D is not coated with the coating portion 22D and is exposed to the outside. The screwed portion 21D is provided at one end (on the right side in FIG. 7) of the conductive plate 30D in the longitudinal direction. More specifically, the top surface 213D of the extending portion 212D of the screwed portion 21D and a lower surface 314D of the flattened conductor 31D are joined by welding or the like. As a result, the second coupling portion 20D and the conductive plate 30D are electrically connected.

As described in this modified example, the electrical connection form between the conductive plate and the first coupling portion and second coupling portion may be different from that of the above-mentioned first embodiment. Various forms (e.g., connection form using not a screw structure but a rivet) may be used as the form for coupling between the first coupling portion and the second coupling portion.

Second Embodiment

Figure 8:
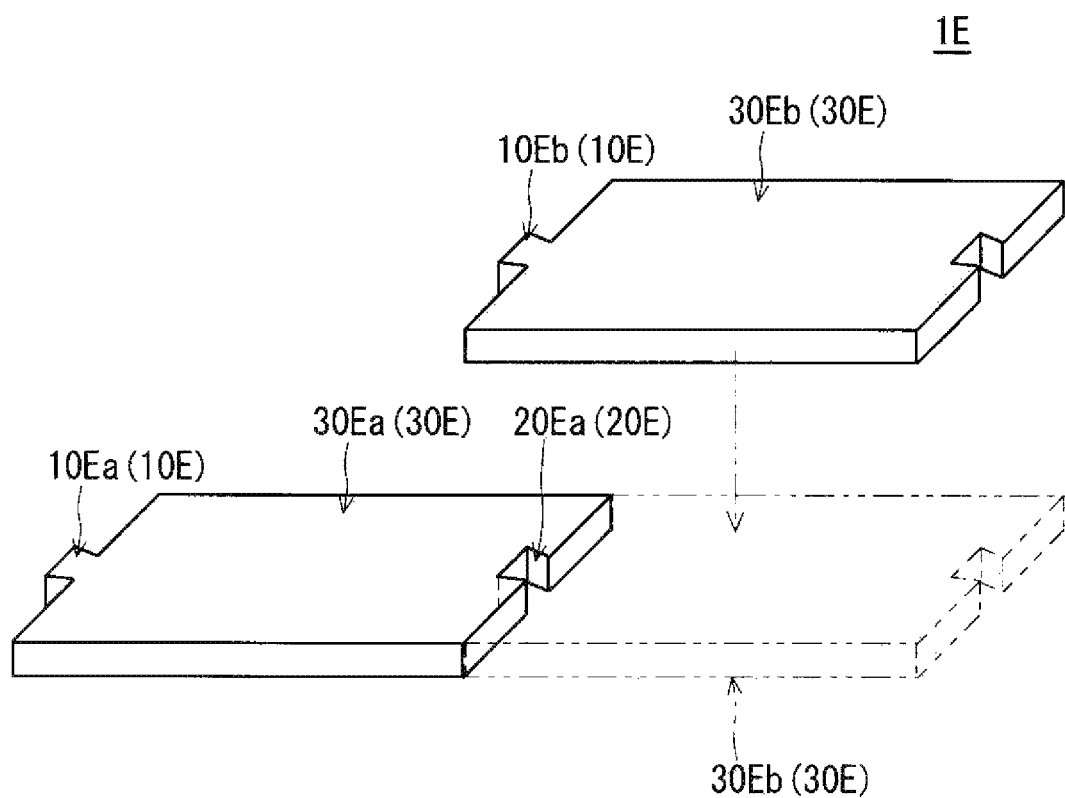
FIG. 8 is a schematic perspective view showing a wiring module 1E.

Next, a wiring module 1E according to a second embodiment will be described. FIG. 8 is a schematic perspective view showing the wiring module 1E according to the second embodiment.

The wiring module 1E includes a plurality of conductive plates 30E, and first coupling portions 10E and second coupling portions 20E that are provided on the outer peripheral portions of the conductive plates 30E and have mutually connectable shapes.

Hereinafter, with reference to FIG. 8, a case will be described in which the wiring module 1E includes two conductive plates 30E, and first coupling portions 10E and second coupling portions 20E that are provided on the outer peripheral portions of the two conductive plates 30E and have mutually connectable shapes. Hereinafter, when the individual conductive plates 30Ea and 30Eb are distinguished from each other, they are denoted by additional alphabetical characters, and when they are not distinguished, they are referred to merely as "conductive plates 30E". The same applies to the first coupling portions 10E and the second coupling portions 20E. It should be noted that, in this embodiment, the conductive plates 30E have the same shape, the first coupling portions 10E have the same shape, and the second coupling portions 20E have the same shape.

Each of the conductive plates 30E is formed in an elongated shape such that a cross section taken along a plane orthogonal to the longitudinal direction has a flattened shape (here, a rectangular shape elongated in one direction). The conductive plate 30E is made of a metal plate having an elongated band shape. The conductive plate 30E is made of a material such as copper, a copper alloy, aluminum, or an aluminum alloy. The conductive plate 30E may be plated with metal such as tin or nickel. As described above, the conductive plate 30E according to the second embodiment is a constituent corresponding to the flattened conductor 31 according to the above-mentioned first embodiment.

In each of the conductive plates 30E, one first coupling portion 10E is provided at the center in the short direction of one end (on the left side in FIG. 8) in the longitudinal direction, and one second coupling portion 20E is provided at the center in the short direction of the other end (on the right side in FIG. 8) in the longitudinal direction.

The first coupling portion 10E is a part of the outer peripheral portion of the conductive plate 30E that has been processed into a protruding shape. The second coupling portion 20E is a part of the outer peripheral portion of the conductive plate 30E that has been processed into a recessed shape. Regarding the adjacent two conductive plates 30Ea and 30Eb, as indicated by long dashed double-short dashed lines in FIG. 8, the first coupling portion 10Eb provided on the outer peripheral portion of the conductive plate 30Eb is fitted to the second coupling portion 20Ea provided on the outer peripheral portion of the conductive plate 30Ea, and thus the first coupling portion 10Eb and the second coupling portion 20Ea are coupled. As a result, the conductive plates 30Ea and 30Eb are electrically connected.

In the second embodiment, the adjacent conductive plates 30Ea and 30Eb are coupled via a fitting structure, and therefore, it is easy to couple the conductive plates 30Ea and 30Eb without using another member for connection (e.g., screw 40).

In the second embodiment, in each of the conductive plates 30E, the first coupling portion 10E is provided at one end in the longitudinal direction, and the second coupling portion 20E is provided at the other end in the longitudinal direction. Therefore, even when a small number of conductive plates 30E are used, it is easy to lay out the wiring module 1E over a long distance.

In the second embodiment, the first coupling portion 10E has a protruding shape whose width increases toward the leading end, and the second coupling portion 20E has a recessed shape whose width decreases toward the opening portion. Therefore, when the first coupling portion 10E is fitted to the second coupling portion 20E, the leading end of the first coupling portion 10E is locked to the opening portion of the second coupling portion 20E, and thus the coupling state of the adjacent conductive plates 30E is retained. In this coupling state, the lateral surface of one conductive plate 30E on which the first coupling portion 10E has been provided is in surface contact with the lateral surface of the other conductive plate 30E on which the second coupling portion 20E has been provided, and therefore, positional shifts between the adjacent two conductive plates 30E are suppressed. It should be noted that the first coupling portion and the second coupling portion may have substantially columnar recessed and protruding shapes as described later with reference to FIGS. 9 and 10, or other shapes. Even in this case, the leading end of the first coupling portion is locked to the opening portion of the second coupling portion 20, and the lateral surfaces of the conductive plates are in surface contact with each other, so that the coupling state of these conductive plates is retained.

Also in the wiring module 1E of the second embodiment, as in the modified example of the first embodiment shown in FIG. 6, at least one of the first coupling portion 10E and the second coupling portion 20E may be provided at the intermediate portion of the conductive plate 30E in the longitudinal direction.

Modified Examples of Second Embodiment

Figure 9:
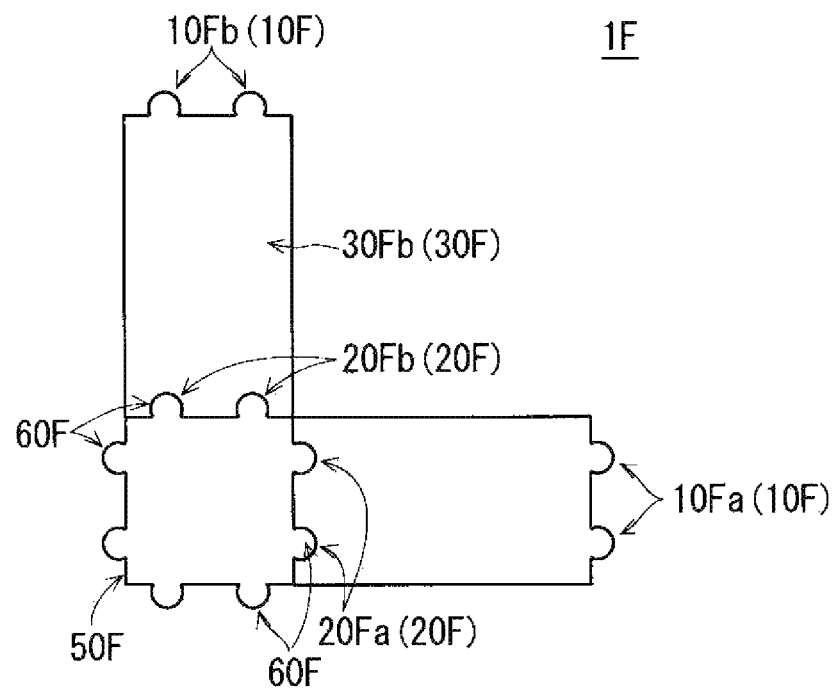
FIG. 9 is a plan view showing a layout of a wiring module 1F.

FIG. 9 is a plan view showing a layout of a wiring module 1F according to a modified example of the second embodiment.

As shown in FIG. 9, the wiring module 1F includes: two conductive plates 30F; first coupling portions 10F and second coupling portions 20F that are provided on the outer peripheral portions of the two conductive plates 30F and have mutually connectable shapes; a branch conductive plate 50F; and branch coupling portions 60F that can be coupled to the second coupling portions 20F, two branch coupling portions 60F being provided on each of the four sides of the outer peripheral portion of the branch conductive plate 50F.

Each of the conductive plates 30F is made of a metal plate having an elongated band shape. In each of the conductive plates 30F, two first coupling portions 10F spaced apart from each other in the short direction are provided at one end in the longitudinal direction, and two second coupling portions 20F spaced apart from each other in the short direction are provided at the other end in the longitudinal direction.

Each of the first coupling portions 10F is a part of the outer peripheral portion of the conductive plate 30F that has been processed into a protruding shape. Each of the second coupling portions 20F is a part of the outer peripheral portion of the conductive plate 30E that has been processed into a recessed shape.

The branch conductive plate 50F is made of a metal plate having substantially a rectangular shape in a plan view. Two coupling portions 60F spaced apart from each other are provided on each of the four sides of the outer periphery of the branch conductive plate 50F.

Each of the coupling portions 60F is a part of the outer peripheral portion of the branch conductive plate 50F that has been processed into a protruding shape, and can be coupled to the second coupling portion 20F of the conductive plate 30F.

Therefore, the two coupling portions 60F provided on one side of the outer periphery of the branch conductive plate 50F are fitted to two second coupling portions 20Fa provided on a conductive plate 30Fa, and thus the two coupling portions 60F are coupled to the two second coupling portions 20Fa. As a result, the branch conductive plate 50F and the conductive plate 30Fa are electrically connected.

Similarly, the two coupling portions 60F provided on one side of the outer periphery of the branch conductive plate 50F are fitted to two second coupling portions 20Fb provided on a conductive plate 30Fb, and thus the two coupling portions 60F are coupled to the two second coupling portions 20Fb. As a result, the branch conductive plate 50F and the conductive plate 30Fa are electrically connected.

In the wiring module 1F according to this modified example, using the branch conductive plate 50F makes it easy to form branches.

It should be noted that an embodiment in which the coupling portions 60F are provided on the four sides of the outer periphery of the branch conductive plate 50F has been described in this modified example, but the coupling portions 60F may be provided at at least three positions on the outer peripheral portion of the branch conductive plate 50F.

Although an embodiment in which the coupling portions 60F of the branch conductive plate 50F can be coupled to the second coupling portions 20F has been described in this modified example, an embodiment in which the coupling portions 60F of the branch conductive plate 50F can be coupled to the first coupling portions 10F may be possible.

Figure 10:
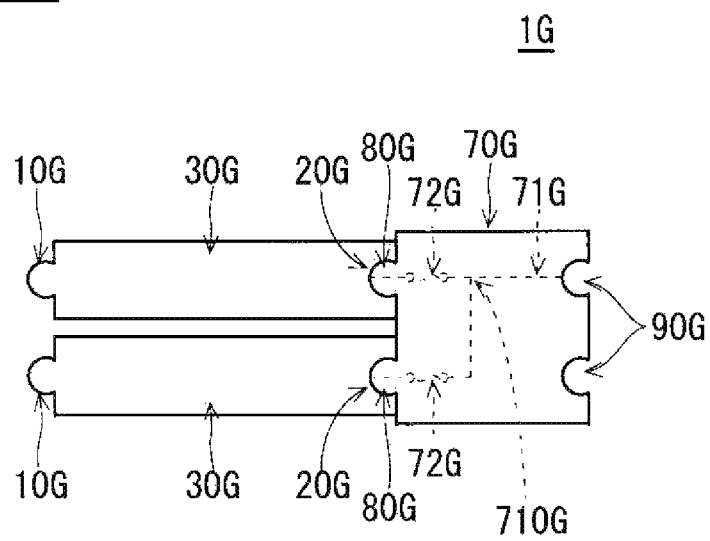
FIG. 10 is a plan view showing a layout of a wiring module 1G.
Figure 11:
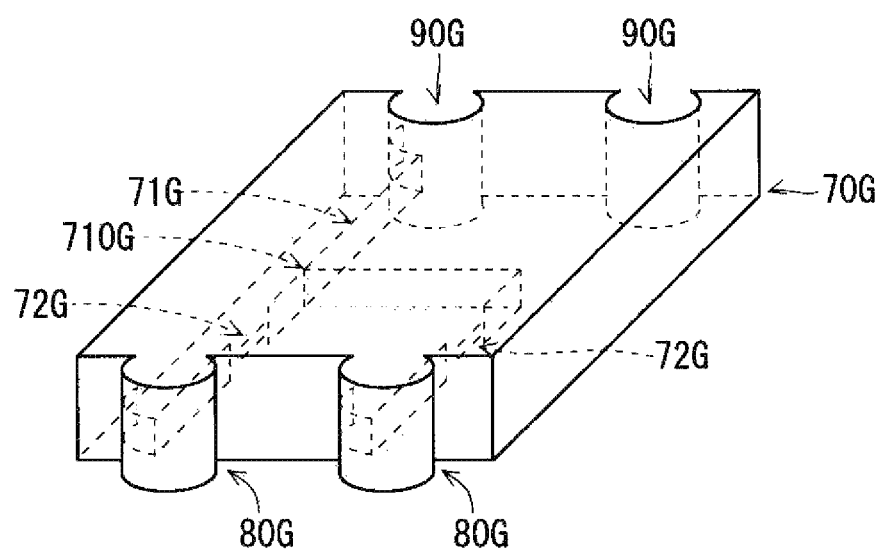
FIG. 11 is a schematic perspective view showing a configuration of a conductive portion including a fuse.

FIG. 10 is a plan view showing a layout of a wiring module 1G according to a modified example of the second embodiment. FIG. 11 is a schematic perspective view showing a configuration of a conductive portion including a fuse.

As shown in FIG. 10, the wiring module 1G includes: two conductive plates 30G; first coupling portions 10G and second coupling portions 20G that are provided on the outer peripheral portions of the two conductive plates 30G and have mutually connectable shapes; fuses 72G; an insulating base 70G that holds the fuses 72G; coupling portions 80G for fuses that are provided on the outer peripheral portion of the base 70G and can be coupled to the second coupling portions 20G; coupling portions 90G for fuses that are provided on the outer peripheral portion of the base 70G and can be coupled to the first coupling portions 10G; and a conductive member 71G that has a conductive path including the fuses 72G and is electrically connected to conductive plates coupled via the coupling portions 80G and 90G for fuses.

Each of the conductive plates 30G are made of a metal plate having an elongated band shape. In each of the conductive plates 30G, one first coupling portion 10G is provided at one end in the longitudinal direction, and one second coupling portion 20G is provided at the other end in the longitudinal direction.

The first coupling portion 10G is a part of the outer peripheral portion of the conductive plate 30G that has been processed into a protruding shape. The second coupling portions 20G is a part of the outer peripheral portion of the conductive plate 30G that has been processed into a recessed shape.

The base 70G is formed into a flattened shape by molding an insulating material such as a resin around the conductive member 71G and the two fuses 72G provided at intermediate portions of the path of the conductive member 71G.

The conductive member 71G is a busbar having a branch portion 710G at an intermediate portion of the path with one end of the conductive member 71G being exposed from the concave of one of the coupling portions 90G for fuses and the other end of the conductive member 71G being exposed from the convexes of the two coupling portions 80G for fuses.

The fuses 72G are provided in the sections of the conductive member 71G between the branch portion 710G and the coupling portions 80G for fuses. The fuses 72G are formed by press-punching a metal plate made of a metal material with a low melting point such as a zinc alloy (e.g., ZnAl) or a copper alloy (e.g., Cu—Fe based alloy), for example. The fuses 72G are narrower than the conductive member 71G and form portions that are easily fused due to Joule's heat when an excessive current flows.

In this modified example, the second coupling portions 20G of the two conductive plates 30G are coupled to the two coupling portions 80G for fuses provided on the outer peripheral portion of the base 70G. As a result, the second coupling portions 20G of the two conductive plates 30G are in contact with the conductive member 71G exposed from the convexes of the two coupling portions 80G for fuses, and thus the conductive member 71G and the two conductive plates 30G are electrically connected.

In this modified example, fuses can be easily incorporated in the wiring module 1G.

Figure 12:
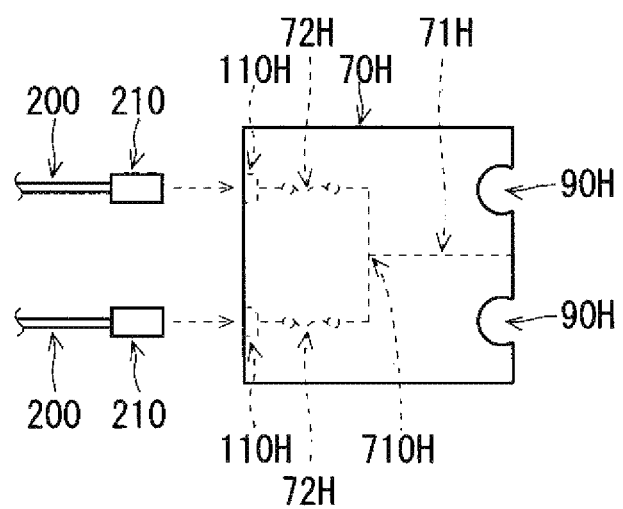
FIG. 12 is a schematic plan view showing a configuration of a conductive portion including a fuse.

FIG. 12 is a schematic plan view showing a configuration of a conductive portion including a fuse.

This conducive portion includes: fuses 72H; an insulating base 70H that holds the fuses 72H; coupling portions 90H for fuses that are provided on the outer peripheral portion of the base 70H and can be coupled to first coupling portions of conductive plates; grooves 110H into which terminals 210 of electric wires 200 are to be inserted; and a conductive member 71H that has a conductive path including the fuses 72H and is electrically connected to a conductive plate coupled via the coupling portions 90H for fuses and the electric wires 200 connected via the grooves 110H.

The base 70H is formed into a flattened shape by molding an insulating material such as a resin around the conductive member 71H and the two fuses 72H provided at intermediate portions of the path of the conductive member 71H.

The two coupling portions 90H for fuses that are parts of the outer peripheral portion of the base 70H are provided on one side (right side in FIG. 12) of the outer peripheral portion of the base 70H. For example, the first coupling portions 10G of the above-mentioned conductive plates 30G can be coupled to the two coupling portions 90H for fuses. The two grooves 110H into which the terminals 210 of the two electric wires 200 obtained by performing extrusion coating to cover a core wire with a resin can be inserted are provided on another side (left side in FIG. 12) of the outer peripheral portion of the base 70H.

The conductive member 71H is a busbar having a branch portion 710H at an intermediate portion of the path with one end of the conductive member 71H being exposed from a portion of the lateral surface between the coupling portions 90H for fuses and the other end of the conductive member 71H being exposed from the lateral surfaces of the two grooves 110H.

In this modified example, the terminals 210 of the two electric wires 200 are coupled to the grooves 110H provided on the outer peripheral portion of the base 70H. As a result, the terminals 210 of the two electric wires 200 are in contact with the conductive member 71H exposed from the lateral surfaces of the two grooves 110H, and thus the conductive member 71H and the two electric wires 200 are electrically connected. It should be noted that an embodiment in which female connection portions (two grooves 110H) are provided on the outer peripheral portion of the base 70H as a configuration for connecting the conductive member 71H and the two electric wires 200 has been described in this modified example, but an embodiment in which male connection portions are provided on the outer peripheral portion of the base 70H is also possible.

Other Modified Examples

A plurality of conductive plates in a wiring module may have different shapes unlike those in the above-mentioned first and second embodiments. Similarly, in a wiring module, first coupling portions or second coupling portions provided on the outer peripheral portions of the conductive plates may have different shapes.

The positions and the numbers of first coupling portions and second coupling portions provided on the outer peripheral portion of a conductive plate can be changed from those in the above-described embodiment.

A connector portion to be electrically connected to an external electrical component may be further provided on conductive plates in addition to first coupling portions and second coupling portions.

It should be noted that the configurations described in the above-described embodiments and modified examples can be used in combination as appropriate as long as they are compatible with each other.

Having described the present design in detail, the foregoing description is illustrative in all aspects and the present invention is not limited thereto. It is understood that countless modified examples not illustrated herein are conceivable without deviating from the scope of the present invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS 1, 1A to 1C, 1E to 1G Wiring module
10, 10a to 10d, 10f to 10s, 10D, 10E, 10Ea, 10Eb, 10F, 10Fa, 10Fb, 10G First coupling portion
20, 20a to 20i, 20k, 20m to 20s, 20D, 20E, 20Ea, 20Eb, 20F, 20Fa, 20Fb, 20G Second coupling portion
30, 30a to 30s, 30D, 30E, 30Ea, 30Eb, 30F, 30Fa, 30Fb, 30G Conductive plate
40 Screw
50F Branch conductive plate
60F Coupling portion
80G, 90G, 90H Coupling portion for fuse

What is claimed is:
1. A wiring module, comprising:
a plurality of conductive plates including a first conductive plate that has an outer peripheral portion, a first end with a corner, and a second end with a corner, the first and second ends are opposite ends of the first conductive plate in a longitudinal direction;
a first coupling portion is provided on the outer peripheral portion of the first conductive plate and is located at the corner of the first end of the first conductive plate; and
a second coupling portion is provided on the outer peripheral portion of the first conductive plate and is located at the corner of the second end of the first conductive plate, wherein the first and second coupling portions are configured to mechanically and electrically connect with other coupling portions of other conductive plates of the plurality of conductive plates.
2. The wiring module of claim 1, further comprising:
a second conductive plate of the plurality of conductive plates has another outer peripheral portion, another first end with a corner, and another second end with a corner, the another first and second ends are opposite ends of the second conductive plate in the longitudinal direction;
another first coupling portion is provided on the another outer peripheral portion of the second conductive plate and is located at the corner of the another first end of the second conductive plate; and
another second coupling portion is provided on the another outer peripheral portion of the second conductive plate and is located at the corner of the another second end of the second conductive plate, wherein the another first and second coupling portions are configured to mechanically and electrically connect with other coupling portions of other conductive plates of the plurality of conductive plates.
3. The wiring module of claim 2, further comprising:
a branch conductive plate has an outer peripheral portion;
a plurality of branch coupling portions provided on the outer peripheral portion of the branch conductive plate, the plurality of branch coupling portions are located at least three positions along the outer peripheral portion of the branch conductive plate.
4. The wiring module of claim 3, wherein a first one of the plurality of branch coupling portions is mechanically and electrically connected to either the first or the second coupling portion of the first conductive plate, and a second one of the plurality of branch coupling portions is mechanically and electrically connected to either the another first or the another second coupling portion of the second conductive plate so that the first and second conductive plates are mechanically and electrically connected to one another via the branch conductive plate.
5. The wiring module of claim 1, further comprising:
an insulating base having a fuse, a coupling portion for the fuse, and a conductive member, wherein the fuse and the conductive member are part of a conductive path that is electrically connected to the first conductive plate via the coupling portion for the fuse.

* * * * *